United States Patent
Gaetjen et al.

(10) Patent No.: US 11,012,239 B2
(45) Date of Patent: *May 18, 2021

(54) TRUSTED CLIENT SECURITY FACTOR-BASED AUTHORIZATIONS

(71) Applicant: Oracle International Corporation, Redwood Shores, CA (US)

(72) Inventors: Scott Gaetjen, Plano, TX (US); Patrick F. Sack, Ashburn, VA (US); William Maroulis, Asburn, VA (US); Matthew S. Piermarini, Edgewater, MD (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,904

(22) Filed: Mar. 9, 2020

(65) Prior Publication Data
US 2020/0213123 A1  Jul. 2, 2020

Related U.S. Application Data

(63) Continuation of application No. 15/825,509, filed on Nov. 29, 2017, now Pat. No. 10,630,480.

(51) Int. Cl.
*H04L 9/32* (2006.01)
*H04L 29/06* (2006.01)
*H04L 9/06* (2006.01)

(52) U.S. Cl.
CPC .......... *H04L 9/3236* (2013.01); *H04L 9/321* (2013.01); *H04L 9/3239* (2013.01); *H04L 63/0876* (2013.01); *H04L 9/0643* (2013.01); *H04L 9/3234* (2013.01); *H04L 2209/127* (2013.01)

(58) Field of Classification Search
CPC ..... H04L 9/3236; H04L 9/321; H04L 9/3239; H04L 9/0876
USPC .............................................. 726/4
See application file for complete search history.

(56) References Cited

U.S. PATENT DOCUMENTS

| | | | |
|---|---|---|---|
| 7,363,656 | B2 | 4/2008 | Weber |
| 7,568,039 | B2 | 7/2009 | Bird |
| 7,814,076 | B2 | 10/2010 | Sack et al. |
| 7,954,150 | B2 * | 5/2011 | Croft ..................... G06F 3/1415 726/21 |
| 8,024,306 | B2 | 9/2011 | Palliyil |
| 8,234,687 | B2 | 7/2012 | Baumhof |
| 8,838,976 | B2 * | 9/2014 | Etchegoyen ............ G06F 21/31 713/176 |
| 9,047,458 | B2 | 6/2015 | Etchegoyen |

(Continued)

OTHER PUBLICATIONS

Axiomatics, "Axiomatics Data Access Filter for Multiple Databases", https://www.axiomatics.com/product/axiomatics-data-access-filter-adaf/, last viewed on May 26, 2017, 5 pages.

(Continued)

*Primary Examiner* — Dant B Shaifer Harriman
(74) *Attorney, Agent, or Firm* — Hickman Becker Bingham Ledesma LLP; Christine E. Orich

(57) ABSTRACT

Trusted client security factor-based authorizations. The techniques allow a server to authorize client requested operations to access a protected resource or service based on trusted client security factors that are obtained at client machines and provided to the server.

23 Claims, 6 Drawing Sheets

(56) References Cited

U.S. PATENT DOCUMENTS

| | | |
|---|---|---|
| 9,438,633 B1 | 9/2016 | Bakshi et al. |
| 9,455,988 B2 | 9/2016 | Oberheide et al. |
| 2005/0033989 A1 | 2/2005 | Poletto |
| 2005/0131900 A1 | 6/2005 | Palliyll |
| 2007/0174429 A1* | 7/2007 | Mazzaferri ............. H04L 67/02 |
| | | 709/218 |
| 2007/0250627 A1 | 10/2007 | May |
| 2009/0307486 A1* | 12/2009 | Grajek ................. H04L 63/123 |
| | | 713/156 |
| 2013/0238876 A1 | 9/2013 | Fiske |
| 2013/0312065 A1 | 11/2013 | Abeyweera |
| 2014/0074716 A1* | 3/2014 | Ni ........................ G06Q 20/401 |
| | | 705/44 |
| 2016/0044034 A1 | 2/2016 | Spilman |
| 2016/0359628 A1 | 12/2016 | Singh |
| 2018/0364917 A1 | 12/2018 | Ki |
| 2019/0028488 A1* | 1/2019 | Woo ................... H04L 67/1097 |

OTHER PUBLICATIONS

Aruba White Paper, "Conquering Today's Bring Your Own Device Challenges a framework for successful BYOD initiatives", dated 2012, 14 pages.

Arcot RiskFort-Installation and Deployment Guide (for Red Hat Enterprise Linux 4.0) Version 1.7, Arcot RiskFort Installation and Deployment Guide (for RHEL 4) dated Mar. 2009, 204 pages.

Gaetjen, U.S. Appl. No. 15/825,509, filed Nov. 29, 2017, Office Action dated Nov. 12, 2019.

Gaetjen, U.S. Appl. No. 15/825,509, filed Nov. 29, 2017, Notice of Allowance dated Dec. 13, 2019.

\* cited by examiner ered, valid digital certificate, etc.) may establish an
TRUSTED CLIENT SECURITY FACTOR-BASED AUTHORIZATIONS

RELATED APPLICATION DATA AND CLAIM OF PRIORITY

This application is a Continuation of prior U.S. patent application Ser. No. 15/825,509 entitled "TRUSTED CLIENT SECURITY FACTOR-BASED AUTHORIZATIONS AT A SERVER," filed Nov. 29, 2017, the contents of which are incorporated by reference for all purposes as if fully set forth herein. The applicant hereby rescinds any disclaimer of claim scope in the parent application or the prosecution history thereof and advise the USPTO that the claims in this application may be broader than any claim in the parent application.

TECHNICAL FIELD

The present invention relates to client-server computing systems and, more particularly, for authorizing client requested operations at a server based on trusted client security factors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Different types of distributed computing architectures exist. One type is the client-server architecture. In a typical client-server architecture, tasks or workloads are distributed between the provider of a resource or a service, called a "server," and the requestor of the resource or service, called a "client." In some configurations, the client and server communicate over a data network from different computing machines via a data networking protocol (e.g., TCP/IP, TCP/IP with SSL, etc.). However, the client and server may operate on the same machine and communicate with each other via a data networking protocol or other interprocess communication protocol (e.g., named pipes).

Often, the server is responsible for protecting the resource or service. That is, the server is responsible for ensuring that only authorized client requests successfully access the protected resource or service. A common way for the server to protect the resource or service is to require the client provide valid authentication credentials before allowing a request from the client to access the protected resource or service. The valid authentication credentials (e.g., valid username/password, valid digital certificate, etc.) may establish an identity associated with the client. The established identity may be used by the server for authorization. For example, the associated identity may identify a user of the client. Requests from the client to the server may be made in the context of the established identity. The server, then, can authorize a request from the client based on the established identity. For example, the server may authorize the request based on a role or roles the user has according to a role-based access control scheme.

However, the operator of the server may desire to authorize access to the protected resource or service based on more than just an established identity associated with the client. For example, the operator may want to authorize access based on one or more client security factors. In this description, a "client security factor" is information programmatically obtained at a client machine that is provided to a server for at least the purpose of the server authorizing requests from the client machine to access a protected resource or service based on the client security factor. One non-limiting example of a client security factor might be a security patch level of the client machine. The operator of the server may wish, for example, to prevent client machines that do not have the latest security patches installed from accessing the protected resource or service.

One challenge with authorizing client requests at a server based on client security factors is trust. In particular, the client machine may not be under control and management of the operator of the server. For example, the client machine may be an employee's or contractor's personal computer. As such, the operator of the server may not trust client security factors obtained by the client machine. For example, the operator of the server may worry that a security patch level reported by the client machine is inaccurate or falsified (e.g., spoofed). Without trust in client security factors obtained by the client machine, the server cannot reliably make authorization decisions based on the client security factors.

The present invention provides trusted client security factor-based authorizations at a server. The solution may be used in lieu of or in addition to other techniques for authorizing client requests to access a protected resource or service at a server.

DETAILED DESCRIPTION

Figure 1:
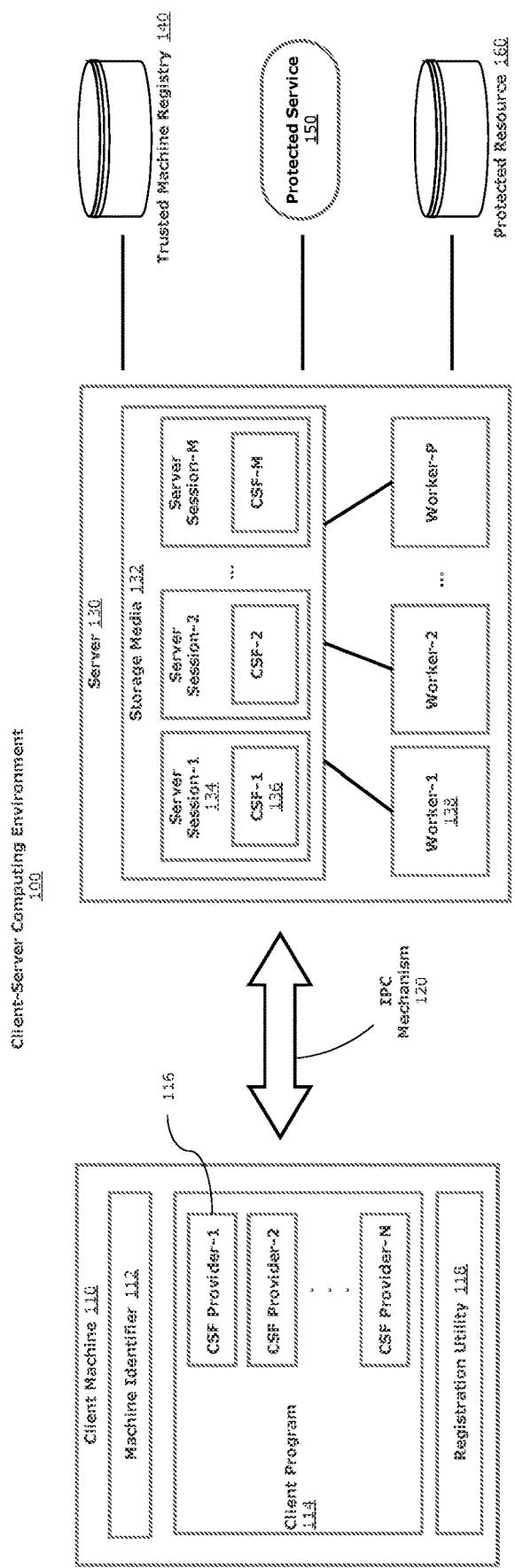
FIG. 1 is a schematic diagram of a client-server computing environment in which some embodiments of trusted client security factor-based authorizations at server are implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to some embodiments of the present invention, techniques for trusted client security factor-based authorizations at a server are provided. The techniques allow the server to authorize client requested operations to access a protected resource or service based on trusted client security factors that are obtained at client machines and provided to the server. The techniques may be performed by a computing system comprising one or more processors and storage media storing one or more programs, the one or more programs having instructions executed by the one or more processors to perform the techniques. The techniques may also be embodied in instructions of one or more programs of a computing system, the computing system having storage media storing the one or more programs and one or more processors for executing the instructions. The techniques may further be embodied in instructions of one or more programs stored on one or more non-transitory computer-readable media, the instructions configured for execution by a computing system having one or more processors and storage media. The one or more processors and storage media of the computing system may be provided by one or more computing machines. An example computing machine is described herein with respect to FIG. 5. As an alternative to implementing the techniques using software, the techniques may be implemented in hardware or in a combination of hardware and software.

The techniques provide an improved, more secure, and more flexible client-server computing system by allowing the server to authorize client requested operations to access a protected resource or service based on information that is programmatically obtained at a client machine and provided to the server. In some cases, a client security factor may be obtainable at the client machine, but not obtainable at the server, without the client machine providing the client security factor to the server. For example, a client security factor may be obtained from a network service (e.g., an LDAP service) that is accessible on a data network to the client machine, but that is not accessible to the server (e.g., because of a network firewall). In this case, if the server is to authorize client requests based on the client security factor provided to it by the client machine, then trust in the client security factor by the server must be established. The techniques provide a solution to this and other needs.

Glossary

The following definitions are offered for purposes of illustration, not limitation, in order to assist with understanding the discussion that follows.

BIOS: BIOS stands for basic input/output system is non-volatile firmware of a computing machine used to perform hardware initialization during the booting process (e.g., power-on-startup), and to provide runtime services for operating system and programs that execute on the computing machine. Some BIOSses store a retrievable serial number.

Cryptographic Hash Function: A cryptographic hash function is a special class of hash function that has certain properties which make it suitable for use in cryptography. In particular, the function is a mathematical algorithm that maps data of arbitrary size to a bit string of a fixed size (known as a digest). The function is designed to be one-way such that it is infeasible to invert the fixed size bit string to recover the original data input to the function.

Digest: A digest, also known as a message digest, hash value, or checksum, is the output of a cryptographic hash function when applied to a given input.

Reflection: Reflection is the ability of a computer program to examine, introspect, and modify its own structure and behavior at runtime. A computer programming language supporting reflection may provide a number of features available at runtime that would otherwise be difficult to accomplish in a lower-level programming language. Such features may include the ability to discover and modify source code constructions (e.g., code blocks, classes, method, protocols, etc.) as a first-class object at runtime, to convert a string matching the symbolic name of a class or function into a reference to or invocation of that class of function, to evaluate a string as if it were a source code statement at runtime, or to create a new interpreter for the programming language's bytecode to give a new meaning or purpose for a programming construct.

SHA: SHA is a family of cryptographic hash functions published by the National Institute of Standards and Technology (NIST). Currently, the family includes SHA-1, SHA-2, and SHA-3. SHA-1 is a 160-bit hash function that resembles the MD5 algorithm. SHA-2 is a family of two similar hash functions, with different block sizes, known as SHA-256 and SHA-512. They differ in the word size; SHA-256 uses 32-bit words where SHA-512 uses 64-bit words. SHA-3 is hash function formerly called Keccak. SHA-3 supports the same hash lengths as SHA-2, but its internal structure differs significantly from others in the SHA family.

Trusted Platform Module (TPM): TPM stands for trusted platform module and is an international standard for a secure cryptoprocessor, which is a dedicated microcontroller designed to secure hardware by integrating cryptographic keys into devices. TPM's technical specification was written by a computer industry consortium called Trusted Computing Group (TCG). International Organization for Standardization (ISO) and International Electrotechnical Commission (IEC) standardized the specification as ISO/IEC 11889 in 2009.

Client-Server Environment

FIG. 1 is a schematic diagram of a client-server computing environment 100 in which some embodiments of trusted client security factor-based authorizations at server are implemented. Environment 100 includes a client machine 110 and a server 130. While environment 100 includes just one client machine for purpose of providing a clear example, it should be understood that environment 100 may include multiple client machines that are configured and operate like client machine 110. Thus, some embodiments support a multi-client environment.

By default, server 130 may not "trust" client machine 110. That is, the operator of server 130 may not have a sufficient level of control and management of client machine 110. For example, the operator of server 130 may not have control and management of who uses client machine 110, how client machine 110 is configured, what software is installed on client machine 110, which users of client machine 110 have root or administrator privileges with respect to an operating system of client machine 110, etc. In this situation, server 130 cannot base authorization decisions on client security factors obtained by client machine 110 without establishing a level of trust that the client security factors are accurate and not falsified or spoofed. Some embodiments include techniques for establishing a level of trust by server 130 in the client security factors.

According to some embodiments, a level of trust by server 130 in the client security factors is established by requiring that client machine 110 be pre-registered in trusted machine registry 140 before server 130 allows requests from client machine 110 to access a protected service 150 or a protected resource 160. The registration of client machine 110 in machine registry 140 is by way of a probabilistically difficult to predict machine registration digest. Some embodiments of computing the machine registration digest are described in greater detail below.

Once the machine registration digest is registered in machine registry 140, a client program 114 executing at client machine 110 may use an inter-process communication (IPC) mechanism 120 to attempt to establish a server session 134 at server 130. As used herein, a "server session" refers to data stored at a server that represents a specific connection of a user of a client machine to the server through a client program. Server 130 may maintain multiple such server sessions (both concurrently and at different times) in storage media 132 of server 130. Herein, a "user" refers to an identity established by successfully verifying authentication credentials (e.g., username/password, digital certificate, etc.) associated with identity. As such, a user may or may not have a human counterpart. For example, a user may be a fictitious user that has authentication credentials for authenticating and authorizing processes that execute as the fictitious user. However, a user may also correspond to a human user that provides (e.g., enters) authentication credentials (e.g., username/password, biometric, digital certificate, etc.).

In the attempt to establish server session 134, server 130 may require client program 114 to provide the registered machine registration digest along with valid authentication credentials of a user. Server 130 may establish server session 134 only if the registered machine registration digest is provided by client program 114. If client program 114 does provide the registered machine registration digest and the provided authentication credential are successfully verified, then trust is established and server 130 may then establish server session 134.

After trust by server 130 in client machine 110 is established, server 130 may request client program 114 via IPC mechanism 120 to obtain one or more specified client security factors at client machine 110. To do this, client program 114 may invoke one or more client security factor providers 116 that execute at client machine 110 as part of client program 114. The client security factors obtained at the client machine 110 are then provided from client machine 110 to server 130 via IPC mechanism 120. Server 130 may set the provided client security factors 136 in the established server session 134. A worker process 138 of server 130 handling a request from the client program 114 to access protected service 150 or protected resource 160 may then evaluate a security policy against the trusted client security factors 136 set in server session 134 for authorizing the request. As explained in greater detail below, how the machine registration digest is computed makes it highly likely that the client security factors 136 obtained and provided by client program 114 to server 130 and set in server session 134 are accurate and not falsified or spoofed.

According to some embodiments, a client security factor can be "static" or "dynamic." A "static" client security factor does not change for the remaining life of the server session after it is initially set in the server session. On the other hand, a "dynamic" client security factor may change from its initial setting during the life of the server session. A non-limiting example of a static client security factor is one that is based on an attribute of or state of client machine 110 that is not likely to change or is not expected to change during the lifetime of the server session such as, for example, trusted platform module (TPM) information of client machine 110, a serial number of client machine 110, a media access control (MAC) address of client machine 110, an operating system version of client machine 110, an operating system kernel patch level of client machine 110, a list of network, security, and/or auditing services that are enabled at client machine 110, information stored in an operating system registry of client machine 110, a trusted operating system attribute of client machine 110, etc. A non-limiting example of a dynamic client security factor is one that is based on an attribute of or a state of client machine 110 that is likely to change or is expected to change during the lifetime of the server session such as, for example, the contents of a filesystem file at client machine 110, the set of processes (programs) executing at client machine 110, Hypertext Transfer Protocol (HTTP) session and cookie information, HTTP request results, lightweight directory access protocol (LDAP) search results, simple object access protocol (SOAP) request results, etc. Note that the above categorization of example client security factors into static and dynamic factors is not intended to be limiting or exclusive. For example, a client security factor classified above as static (e.g., a list of enabled services at client machine 110) could, in some implementations, be configured as a dynamic client security factor. Overall, the client security factors configured as static client security factors and the client security factors configured as dynamic client security factors may vary according to the requirements of the particular implementation at hand.

According to some embodiments, when server 130 requests client program 114 at client machine 110 to obtain a specified set of one or more client security factors after establishing server session 134, server 130 may specify which of the client security factors are static and which are dynamic. In response to this request from server 130, the client program 114 may obtain all specified client security factors including both static and dynamic factors and then send the obtained client security factors to server 130 for setting in server session 134. Thereafter, the client program 114 may re-obtain only the dynamic client security factors during the remaining lifetime of the server session and not re-obtain the static dynamic security factors during the remaining lifetime of the server session. For example, the client program 114 may re-obtain the dynamic client security factors whenever client program 114 sends a request to server 130 to access protected service 150 or protected resource 160 in the context of server session 134. Server 130 may then update server session 134 with the new dynamic client security factors before worker process 138 handles the request and evaluates a security policy against the updated set of trusted client security factors 136 set in server session 134. Thus, some embodiments support both client security factors that do not change for the lifetime of server session 134 and client security factors that change during lifetime of server session 134 and evaluating security policies against up-to-date client security factors 136 set in server session 134.

Detailed operation of trusted client security factor-based authorizations at a server is described in greater detail below with respect to the client-server interaction diagrams of FIG. 2, FIG. 3, and FIG. 4. However, some embodiments of the various components in environment 100 will first be described to enable a more complete understanding of the discussion that follows.

Client machine 110 is a computing machine having one or more processors and storage media and other hardware components like those described below with respect to the example computing machine depicted in FIG. 5. For example, client machine 110 may be desktop computer, a workstation computer, a laptop computer, or even a portable computing device such as a smartphone or a tablet computer. Client machine 110 may also be configured with a software system for controlling the operation of client machine 110, like the example software system described below with respect to FIG. 6. In this configuration, client program 114 and registration utility 118 may each execute as an application on an operating system of client machine 110. However, some or all of each of or either of client program 114 and registration utility 118 may be implemented by the operating system. Client machine 110 may itself by a server for another client. As such, client machine 110 can be both a client of server 130 and a server of one or more other clients. Operation of registration utility 118 is described in greater detail below with respect to FIG. 2.

It should be noted, however, that while registration utility 118 can be executed at client machine 110, registration utility 118 can instead be executed at another computing machine. For example, registration utility 118 can be executed at a computing machine under the control of the operator of server 130. Thus, there is not requirement that registration utility 118 only executed at client machine 110.

Client program 114 may be specifically programmed as an application to interact with server 130. As such, client program 114 and server 130 may use a protocol by which client program 114 can issue requests via IPC mechanism 120 to server 130 to access protected service 150 or protected resource 160. For example, the protocol may be connection-oriented (e.g., transmission control protocol/internet protocol (TCP/IP)) or connectionless (e.g., user datagram protocol (UDP)). The protocol may allow the client program 114 to submit and allow server 130 to receive requests that include one or more commands to access protected service 150 or protected resource 160. The format of the commands submitted in the requests may vary depending on the capabilities of server 130. For example, if server 130 is a database management system server, then the format of the commands may be structured query language (SQL) commands or the like or a variant thereof such as, for example, SQL SELECT, UPDATE, DELETE, or INSERT commands, or the like. On the other hand, if server 130 implements the hypertext transfer protocol (HTTP), then the commands may be HTTP GET, POST, HEAD commands, or the like. It is also possible that server 130 supports multiple command formats such as, for example, supporting both HTTP and SQL commands. These are just examples, and other command formats are possible, and the present invention is not limited to any particular request/command format for requesting access to protected service 150 or protected resource 160.

IPC mechanism 120 can be any of a variety of different types of inter-process communication mechanisms. For example, IPC mechanism 120 may be a connection-oriented messaging mechanism allowing for bi-directional communication between client machine 110 and server 130. Non-limiting examples of connection-oriented messaging mechanisms that may be used to provide IPC mechanism 120 include TCP/IP and named pipes. However, a connectionless mechanism may instead be used such as, for example, UDP or IP. In some embodiments, IPC mechanism 120 is cryptographical secured using an end-to-end encryption mechanism such as, for example, the secure sockets layer (SSL) or transport layer security (TLS).

Server 130 itself may be implemented by one or more computing machines. The storage media 132 of server 130 may be provided by the collective storage media of the one or more computing machines. Worker process 138 may execute on one of the one or more computing machines of server 130. Each computing machine (or the computing machine) of server 130 may have one or more processors and storage media and other hardware components like those described below with respect to the example computing machine depicted in FIG. 5. In addition, each computing machine (or the computing machine) of server 130 may also be configured with a software system for controlling the operation of the computing machine, like the example software system described below with respect to FIG. 6. In this configuration, worker process 138 may execute as an application on an operating system of one of the computing machines (or the computing machine). However, some or all of worker process 138 may be implemented by an operating system.

Server 130 may protect service 150 and/or resource 160. Service 150 may be any network service under access control. In this configuration, server 130 may function as an access control proxy for service 150. However, it also possible for service 150 to function as a back-end network service for server 130 such as in a multi-tier server architecture. For example, server 130 may be a front-end server of an online (Internet) service and service 150 may be an application server that provides specific online application functionality of the online service.

Resource 160 may be any container of data under access control. The container may take a variety of different forms and no particular form is required. For example, the container may be a file, a folder, a database, a database table (or a set of database tables), a database row (or a set of database rows), a database column (or a set of database columns), a database cell (or a set of database cells), or other data container or set of data containers.

While server 130 is shown as protecting only one service 150 and one resource 160 in FIG. 1 for the purpose of providing a clear example, it should be understood that server 130 may protect multiple services like service 150 and/or multiple resources like resource 160, each with their own security policy governing access to the respective service or resource. Thus, service 150 and resource 160 should be viewed representative of services and resources that server 130 may be responsible for protecting.

A security policy applied to service 150 may restrict access to service 150. Similarly, a security policy applied to resource 160 may restrict access to resource 160. A security policy may be stored as an access control list or the like. According some embodiments, a security policy that protects service 150 or resource 160 is formulated in terms of one or more trusted client security factors. For example, a security policy might specify that only client machines at or above a particular patch level can access resource 160. In this example, the patch level of a particular machine obtained by the particular client machine and provided to server 130 according to techniques described herein may be a trusted client security factor on which on authorization decision may be based.

While a security policy that protects service 150 or resource 160 may be based on just trusted client security factors, the security policy can also be based on other factors. For example, a security policy can be based on a trusted client security factor and the identity or role of the user. For example, resource 160 might be a column of a database table that stores social security numbers and may be protected by a security policy that requires the accessing user have a human resources role and also require that client machines requesting access to the social security number column have a certain minimum patch level. In this case, a user requesting access from a client machine that meets the certain minimum patch level but that does not have the human resources role, may not be granted access to data in the social security number column.

According to some embodiments, trusted machine registry 140 is implemented as a whitelist of trusted client machines. Each trusted client machine is registered in trusted machine registry 140 by its corresponding machine registration digest. Trusted machine registry 140 may be implemented as a database. For example, trusted machine registry 140 may be a particular table in the database where each of the rows of the table contains the machine registration digest of a trusted client machine. The row may also contain or reference (point to) other information such as a specified set of client security factors to obtain from the client machine and which client security factors are dynamic and which are static.

According to some embodiments, a single set of client security factors to obtain is specified for all client machines registered in machine registry 140. However, a set of client security factors to obtain may be specified for a group of trusted client machines or for individual trusted client machines. For example, the specified set of client security factors to obtain from client machines in the engineering department may be different from the specified set of client security factors to obtain from client machines in the sales department, or the specified set of client security factors to obtain from Bob's client machine may be different from the specified set of client security factors to obtain from Chris' client machine. Thus, some embodiments support obtaining different sets of client security factors from different client machines.

Storage media 132 of server 130 may store data representing established server sessions. Thus, server 130 may support multiple server sessions, including supporting concurrently established server sessions. Generally, a server session (e.g., 134) represents a specific connection of a user to server (e.g., 130) through a client program (e.g., 114). Server session 134 has a lifetime which generally may last from the time the user uses client program 114 to connect to server 130 and until the time the user disconnects or exits client program 114. During the lifetime of server session 134, the user may use client program 114 to submit one or more requests to server 130 to access protected service 150 or protected resource 160 in the context of server session 134.

It should be understood that the lifetime of server session 134 may be independent of the lifetime of any particular network connection by which a request or requests to access the protected service 150 or resource 160 are submitted from client program 114 to server 130 via IPC mechanism 120 in the context of server session 134. For example, the lifetime of server session 134 may span the lifetimes of multiple network connections over which requests in the context of server session 134 are submitted by client program 114. However, it is also possible for the lifetimes of a network connection and server session 134 to coincide, or for the lifetime of server session 134 to be within the lifetime of a network connection.

It should also be noted that a data structure stored in storage media 132 containing data of server session 134 may be reused for multiple server sessions across multiple requests. Thus, a data structure stored in storage media 132 containing data of server session 134 may not be dedicated to storing server session data for just one particular server session. By reusing the data structure across multiple requests and server sessions, computing resources of storage media 132 and server 130 are conserved. It should further be noted that there is not necessarily a one-to-one correspondence between server session 134 and worker process 138. For example, server 130 may maintain a pool of worker processes over which requests from client programs 114 are handled. As such, the same worker process may handle multiple requests in the context of different server sessions. However, it is also possible for worker process 138 to be dedicated to handling all requests submitted in the context of server session 134.

When a set of client security factors are received by server 130 from client machine 110 via IPC mechanism 120, they may be set in a server session 134. According to some embodiments, the set of client security factors are provided by client program 114 as a set of key-value pairs. The set of key-value pairs are set by server 130 in the server session 134 where they are accessible to worker process 138 when handling a request from client program 114 in the context of the server session 134. The worker process 138 may query the set of key-value pairs set in the server session to evaluate a security policy associated with protected service 150 or protected resource 160. The security policy may specify a set of conditions that must be satisfied by the set of key-value pairs in order for worker process 138 to grant a request to access protected service 150 or protected resource 160. For example, a condition may specify a key of a key-value pair that must exist in the set of key-value pairs and specify a value or pattern that the value of the key-value pair must match. If a value is specified, then an exact match may be required of the value of the key-value pair for the condition to be satisfied. If a pattern such a regular expression or other pattern matching expression is specified, then the value of the key-value pair must match the pattern for the condition to be satisfied.

Alternatively, a condition may be a program, function, routine, or other logic executed by worker process 138 that evaluates that inspects and evaluates the set of key-value pairs 136 set in server session 134 to determine whether the condition in satisfied. For example, in the context of a database management server system, the set of key-value pairs 136 set in server session 134 may be inspected and evaluated for one or more conditions by a stored procedure such as, for example, a PL/SQL program. To determine whether the set of key-value pairs 136 set in a server session 134 satisfy a particular security policy, server 130 may invoke one or more stored procedures providing the set of key-value pairs 136 are input to the invocation. The output or return value of the stored procedure invocation may then indicate whether the security policy is met or not. Based on whether the security policy is met or not, worker process 138 may allow or deny the access requested by client program 114 to protected service 150 or protected resource 160.

Machine Registration

Figure 2:
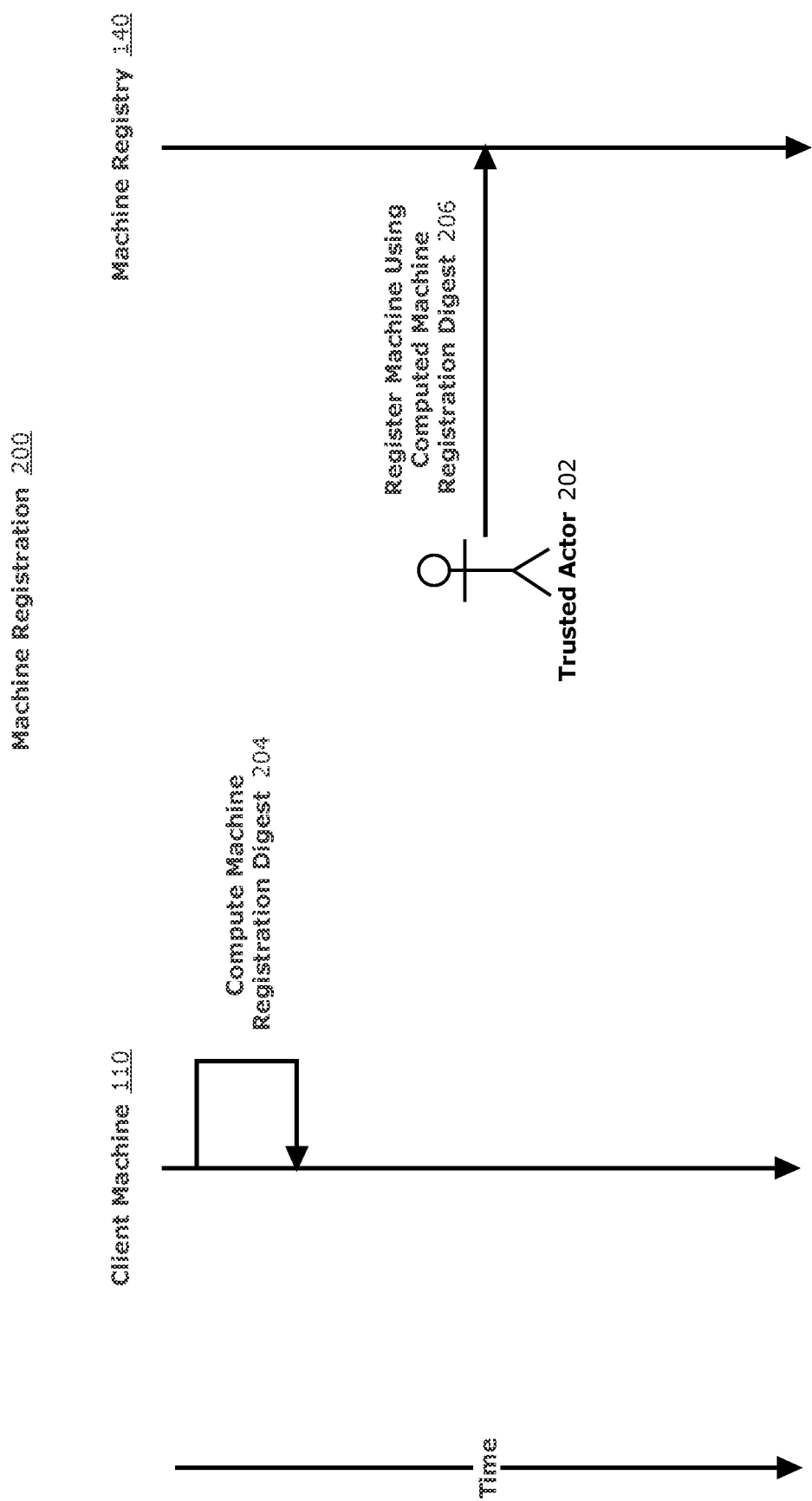
FIG. 2 is an interaction diagram of registering a client machine according to some embodiments of trusted client security factor-based authorizations at server.

Turning now to FIG. 2, it is an interaction diagram of a process 200 for registering client machine 110 in trusted machine registry 140, according to some embodiments of trusted client security factor-based authorizations at server 130.

Initially, a trusted actor 202 installs client program 114 on client machine 110. Trusted actor 202 can be an employee or contractor or other person trusted by the operator of server 130. While in some embodiments trusted actor 202 is a human, trusted actor 202 is a trusted automated computer process in other embodiments. Thus, some embodiments of machine registration process 200 do not involve a human.

Installation of client program 114 on client machine 110 may include installation of one or more client security factor providers 116. Client security factor provider 116 may plugin to client program 114 via an application programming interface such that client security factor provider 116 executes in the same process or set of processes at client machine 110 as part of client program 114. Client security factor provider 116 may be pre-configured to obtain one or more client security factors available in the environment in which client machine 110 operates. For example, client security factor provider 116 may be pre-configured to obtain information from an enterprise lightweight directory access protocol (LDAP) server or other network service accessible to client machine 110. Thus, some embodiments allow for custom client security factor providers that are pre-configured to obtain client security factors that are particular to a given client-server environment in which client machine 110 operates.

While client program 114 may operate with one or more client security factor providers 116, there is no requirement that this be the case. Client program 114 may execute at client machine 110 with using any client security factor providers. In this case, client program 114 may be pre-configured with a set of one or more client security factors to obtain. Even where client program 114 does execute at client machine 110 using one or more client security factor providers 116, client program 114 may still be pre-configured to obtain one or more client security factors in addition to any client security factors that one or more client security factor providers 116 are pre-configured to obtain. Thus, some embodiments provide "out-of-the-box" client security factors by way of pre-configuration of client program 114 and "extensible" or "custom" client security factors by way of pre-configuration of one or more client security factor providers 116 that plugin to client program 114 execution at client machine 110.

Integrity of client program 114 including any client security factor providers 116 may be ensured by computing a probabilistically difficult to predict digest of client program 114 and any client security factor providers 116 as installed on client machine 110 by trusted actor 202. Installation of client program 114 and any providers 116 is trusted by server 130 by way of trusted actor 202 performing the installation. The digests computed for client program 114 and any providers 116 as installed by trusted actor 202 can be used by server 130 to verify the integrity of client program 114 and any providers 116 when client security factors are subsequently provided from client machine 110 to server 130 via IPC mechanism 120. In particular, the digests may be used in computing the machine registration digest for client machine 110 that client program 114 must compute and provide to server 130 in order to establish server session 134 by which server 130 authorizes requests to access protected service 150 and protected resource 160. Since the digests of client program 114 and any providers 116 are probabilistically difficult to predict, it is highly improbable they can be guessed, fabricated, or spoofed. As such, if client machine 110 can compute and provide its pre-registered machine registration digest, then it is highly probable that client program 114 and any providers 116 have not been altered or tampered with since their installation on client machine 110 by trusted actor 202. Similarly, it is also highly probable that the program executing on client machine 110 that computes and provides the machine registration digest to server 130 is client program 114 and any providers 116 as installed on the client machine 110 by trusted actor 202 and not some other untrusted client program such as a client program not installed by a trusted actor 202.

At step 204, trusted actor 202 invokes machine registration utility 118. When invoked, machine registration utility 118 in turn invokes client program 114 to generate the machine registration digest for client machine 110. According to some embodiments, client program 114 computes the machine registration digest based on all of:

A machine identifier 112 that ensures the machine registration digest is unique at least among the client machines registered in registry 140; and A digest or digests of client program 114 and any client security factor providers 116 installed on client machine 110.

According to some embodiments, machine identifier 112 is obtained from a basic input output system (BIOS) device of client machine 110. For example, machine identifier 112 can be a machine serial number or other machine, motherboard, or processing unit identifying information obtained from a BIOS device of client machine 110. According to some embodiments, machine identifier 112 is obtained from a trusted platform module (TPM) of client machine 110. TPM is a standardized device that enables trust in computing platforms. A current TPM standard is defined by ISO/IEC 11889-1:2009 and revised by ISO/IEC 1189-1:2015, the entire contents of each of which is hereby incorporated by reference as if fully set forth herein. Other information obtainable from client machine 110 may be used as machine identifier 112. For example, a media access control (MAC) address of a network card of client machine 110 may be used as machine identifier 112. According to some embodiments, a globally unique identifier (GUID) is used as machine identifier 112. In this case, client program 114 or machine registration utility 118 can generate a GUID and store the GUID locally at client machine 110 in a location that is accessible to client program 114. For example, the GUID may be stored in a known filesystem file at client machine 110 with file permissions that allow client program 114 to access and read the file. The use of a GUID as machine identifier 112 may be useful if machine identifying information from BIOS or TPM module is not available or not reliable. In some embodiments, when the GUID is locally stored at client machine 110 in a known filesystem file, it is stored in a read-only configuration such that client program 114 or other programs executing at client machine 110 cannot tamper (e.g., overwrite or modify) the locally stored GUID. For example, the known filesystem file permissions storing the GUID may be set with read-only permissions by registration utility 118.

The digest or digests of client program 114 and any client security providers 116 may be computed based on the client program 114 and any client security providers 116 as stored at client machine 110 for execution by client machine 110. For example, the digest or digests may be computed based on contents of one or more executable files (e.g., .EXE files) and/or one or more shared library files (e.g., .DLL or .SO files) that are executed as client program 114 at client machine 110.

Each computed digest for client program 114 and any client security factor providers 116 is preferably probabilistically difficult to predict. For this, a cryptographic hash function that provides a desired level of security may be used to compute the digest. For example, a variant of the secure hash algorithm (SHA) may be used. For example, a digest may be SHA-1, SHA-2, or SHA-3 message digest. The cryptographic hash function that is used preferably does not have a publically known attack demonstrated in practice.

For example, SHA-2 and SHA-3 may be preferred over SHA-1 which has at least one publically known collision attack demonstrated in practice.

The machine registration digest may itself be generated by client program 114 by applying a cryptographic hash function to machine identifier 112 and the digest or digests computed for client program 114 and any client security factor providers 116. In this case, machine identifier 112 and the digest or digests may be combined in a deterministic way such as, for example, by concatenating machine identifier 112 and the digest or each of the digests in a pre-determined order. Alternatively, the machine registration digest may be the set of ordered or unordered values including machine identifier 112 and the digest or each of the digests computed for client program 114 and any client security factor providers 116.

Based on foregoing discussion, one skilled in the art will appreciate that there are different ways in which machine registration digest may be generated by the client program 114 based on machine identifier 112 and one or more digests of client program 114 and any client security factor providers 116. The present invention is not limited to any particular way so long as the machine registration digest is based on at least machine identifier 112 and one or more probabilistically difficult to predict digests of client program 114 and any client security factor providers 116 that obtain client security factors at client machine 110 for trust by server 130. For example, client program 114 may generate the machine registration digest based on machine identifier 112 and a digest computed by applying a cryptographic hash function to the executable and/or shared library file or files that contain the instructions of client program 114 and any client security factor providers 116.

At step 206, trusted actor 202 registers the machine registration digest computed at step 204 in machine registry 140. Registration may include specifying a set of client security factors to obtain from the registered client machine 110. Further, registration may include specifying which client security factors to obtain are static and which are dynamic. Static and dynamic client security factors are described in greater detail elsewhere in this description.

Server Session Establishment

Figure 3:
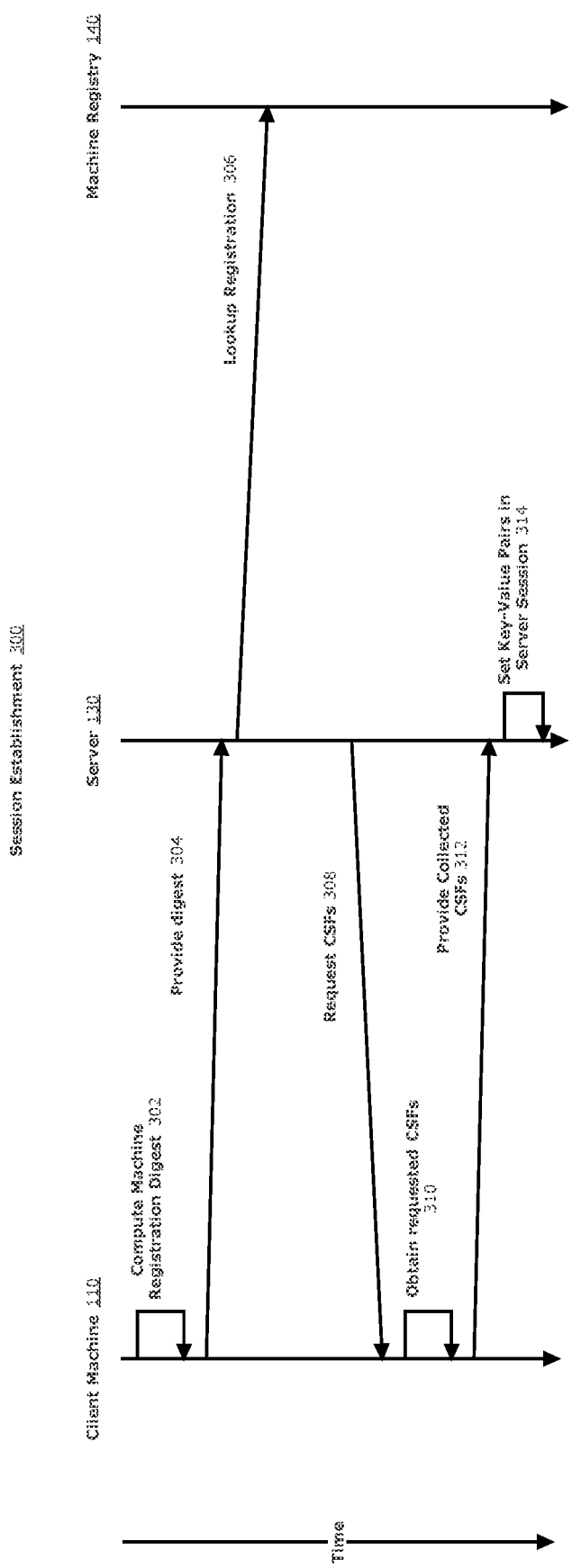
FIG. 3 is an interaction diagram of establishing a session according to some embodiments of trusted client security factor-based authorizations at server.

FIG. 3 is an interaction diagram of a process 300 for establishing server session 134, according to some embodiments of trusted client security factor-based authorizations at server 130. While steps of process 300 are depicted in a certain order on FIG. 3, one skilled in the art will understand based on the description herein that a step or steps may be performed in a different order than as depicted.

At step 302, client program 114 computes the pre-registered machine registration digest. Preferably, the machine registration digest and the digest or digests of client program 114 and any providers 116 are not stored at client machine 110 after registration process 200. By doing so, client program 114 is forced to re-compute the machine registration digest including the digest or digests of client program 114 and any providers 116 when subsequently attempting to establish server session 134 at server 130. At step 302, client program 114 may or may not have already established a network connection with server 130. Thus, client program 114 can compute the machine registration digest before or after establishing to network connection with server 130. In some embodiments, a read-only filesystem file stored at client machine 110 or other read-only configuration stored at client machine 110 specifies the digests that client program 114 must compute and provide to sever 130 when attempting to established server session 134. For example, the read-only file or configuration information may specify the executable file(s) and/or shared library file(s) for which digests must be computed and provided to server 130 by client program 114.

Computation of the machine registration digest may occur as described previously. Specifically, client program 114 obtain machine identifier 112 from client machine's BIOS or other source. Client program 114 also computes a digest or digests of client program 114 and any providers 116 as stored at client machine 110. The digest or digests of client program 114 any providers 116 may be computed using a cryptographic hash function (e.g., SHA-1, SHA-2, SHA-3, etc.) For example, the digest or digests may be computed based on the contents of an executable file and/or one or more shared library files that are executed by client machine 110 as client program 114. Client program 114 may then generate the machine registration digest based on the obtained machine identifier 112 and the computed digest or digests. The machine registration digest itself may be generated as a set of order or unordered values including the machine identifier 112 and the computed digest or digests of client program 1114 and any providers 116. Alternatively, the machine registration digest itself may be generated as a digest using a cryptographic hash function (e.g., SHA-1, SHA-2, SHA-3, etc.) in which the machine identifier 112 and the computed digest or digests of client program 114 and any providers 116 are concatenated or assembled together in a deterministic way and the result of the concatenation or assembly is input to the cryptographic hash function which is then applied to the input to generate the machine registration digest.

At step 304, client program 114 provides the computed machine registration digest to server 130 as part of an attempt to establish server session 134. In addition to providing the machine registration digest computed at step 302, client program 114 may also provide authentication credentials of a user or authentication information based thereon. The authentication information based thereon may be a trusted user identifier, a trusted session identifier, a trusted single-sign on token, or other authentication information that is obtained by client machine 110 using authentication credentials of a user and trusted by server 130 to establish the identity of user.

At step 306, server 130 verifies that client machine 110 is registered in trusted registry 140. This may be done with a query against trusted registry 114. The query may attempt a lookup a registration entry in trusted registry 140 based on the machine registration digest provided by client machine in step 302. According to some embodiments, machine identifier 112 is used in the query as a key for the registration entry. For this, machine identifier 112 may be provided to server 130 by client program 114 along with the machine registration digest in step 302. In this case, the registration entry may contain the digest or digests of client program 114 and any providers 116 computed as part of registration process 200. At step 306, server 130 may compare the digest or digests of the machine registration digest provided in step 302 to the digest or digests of the registration entry to determine whether client machine 110 is trusted. If the comparison reveals that the digests provided by client machine 110 in step 302 and the digest of the registration entry match, then server 110 trusts client machine 110. Otherwise, server 110 may not trust client machine 110 and refuse to establish server session 134. According to some embodiments, the machine registration digest provided by client machine 110 at step 302 is used as a key for the registration entry. In this case, server 130 trusts client machine 110 if a registration entry exists in trusted registry 140 by that key. Otherwise, server 130 may not trust client machine 110 and refuse to establish server session 134.

If, at step 306, server 130 determines not to trust client machine 110, then server 130 may message client machine 110 informing as such and process 300 ends. Otherwise, if server 130 determines to trust client machine 110 based on a match registration entry in trusted registry 140, then server, at step 308, may request client machine 110 to provide set of one or more client security factors referred to herein after as the "requested client security factors". The requested client security factors may be for all client machines registered in trusted registry 140 (e.g., a default set of client security factors), a group of client machines registered in trusted register 140 of which client machine 110 is a member, or specific to client machine 110. When requesting the requested client security factors, server 130 may specify which of the requested client security factors are static and which are dynamic.

At step 310, client machine 110 receives the requested client security factors and obtains the requested client security factors including all static and all dynamic client security factors. The requested client security factors may indicate which client security providers should be invoked to obtain the requested client security factors. Such indication may be made by a character string value matching the symbolic name of a class or function of a client security provider or of client program 114. Client program 114 may use reflection techniques to convert the string value into a reference to or invocation of that class or function. Client program 114 then obtains the client security factor as a returned result value of the invocation. At step 312, client machine 110 provides the client security factors obtained at step 310 to server 130 via IPC mechanism 120. At step 314, server 130 sets (stores) the client security factors obtained at step 312 as a set of key-value pairs 136 in server session 134. In some embodiments, the set of key-value pairs 136 are set in the server session 134 in read-only/immutable memory portion of storage media 132 such that they cannot be modified after being set in the server session 134 for the remaining lifetime of the sever session 134.

According to some embodiments, to provide further trust by server 130 in the client security factors provided by client machine 110 at step 312, server 130 requires that both (1) the machine registration digest be provided by client machine 110 to server 130 (Step 304) and (2) the obtained client security factors be provided by client machine 110 to server 130 (Step 312) over the same established network connection between client machine 110 and server 130. By doing so, trust by server 130 in the client security factors received from client machine 110 over the network connection can be established transitively by way of the network connection over which the server 130 previously received the machine registration digest from client machine 110. For an additional level of trust, server 130 may also require end-to-end encryption for the network connection (e.g., SSL, TLS, etc.).

Trusted Client Security Factor Authorizations

Figure 4:
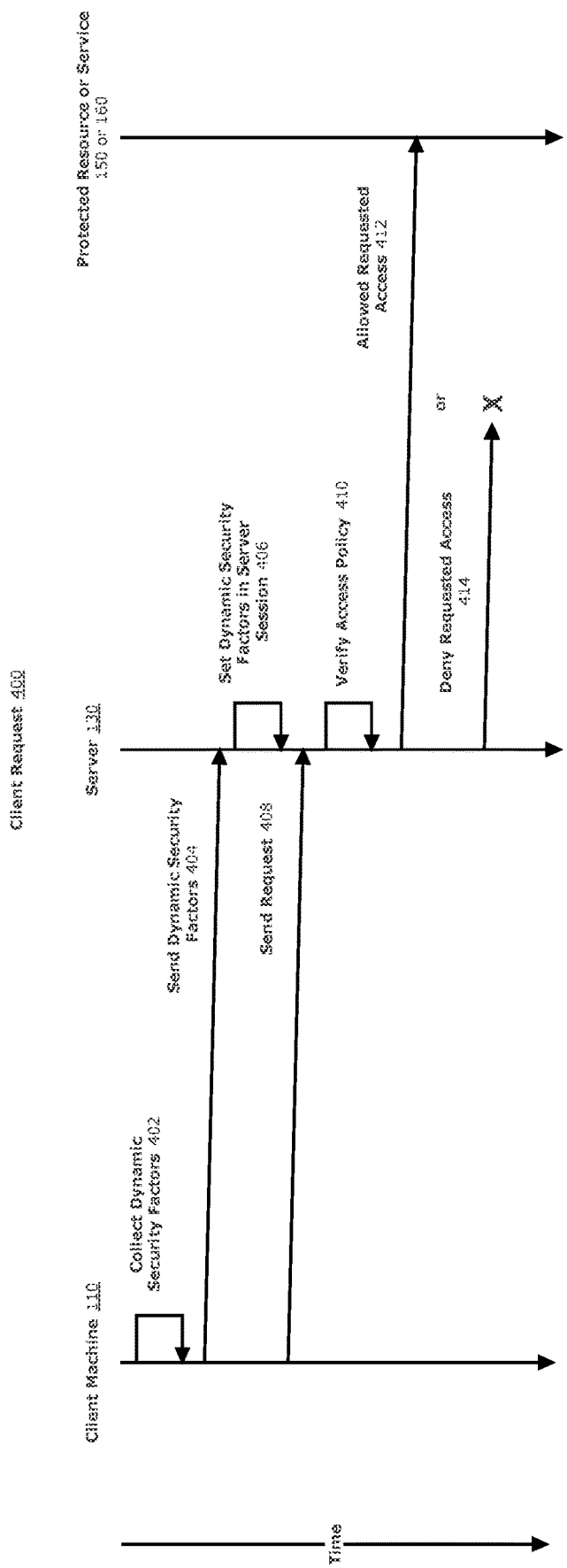
FIG. 4 is an interaction diagram of authorizing a client request according to some embodiments of trusted client security factor-based authorizations at server.

FIG. 4 it is an interaction diagram of a client request process 400 for trusted client security factor-based authorizations at server 130. Process 400 may be performed whenever client program 114 sends a request to server 130 to access protected service 150 or protected resource 160.

At step 402, client program 114 obtains any dynamic client security factors that were specified as dynamic in step 308 when server 130 provides the requested client security factors to client program 114. At step 402, client program 114 may obtain the dynamic client security factors in the same manner they were obtained at step 310 when attempting to established server session 134.

At step 404, client program 114 sends the dynamic client security factors obtained at step 402 to server 130. Trust by server 130 in the provided dynamic client security factors may be established transitively by way of the network connection used by client program 114 to provide the machine registration digest at step 302 when attempting to establish server session 134. In this case, server 130 may require client program 114 to provide the dynamic client security factors at step 404 over the same network connection. Alternatively, server 130 may request client program 114 to re-provide the machine registration digest at step 404 for verification by server 130. Note that this does not require client program 114 to re-compute the machine registration digest as it may re-use the machine registration digest computed at step 302 when attempting to establish server session 134.

At step 406, assuming server 140 trusts the dynamic client security factors provided at step 404, server 130 sets the provided dynamic security factors in server session 134 overriding any existing key-value pairs in server session 134 for those factors.

At step 408, a request from client program 114 is received by server 130. The request may contain a command (e.g., a SQL command or a HTTP command) to access protected service 150 or protected resource 160.

At step 410, server 130 evaluates a security policy associated with the protected service 150 or protected resource 160 for which access is requested. Specifically, the security policy is evaluated against the set of key-value pairs set in server session 134 as described above.

At step 412, the requested access to protected service 150 or protected resource 160 is allowed by server 130 if the set of key-value pairs set in server 134 satisfy the security policy based on the evaluation performed at step 410. Otherwise, server 130 denies the requested access at step 414.

Database Server Example

According to some embodiments, server 130 is a relational database management server. In this scenario, client program 114 (and any client security factor providers 166) is a database client. Client program 114 is configured to retrieve client security factors based on the requested client security factors provided by server 130. Thus, server 130 dictates which client security factors client program 114 must obtain and provide back to server 130. According to some embodiments, server 130 sends instructions to client program 114 for computing the machine registration digest which is then executing by client program 114 using reflection techniques. In this configuration, client program 114 need not be pre-configured with instructions for computing the machine registration digest and may receive them from registration utility 118 and server 130. The same technique may also be used to send instructions for obtaining the requested client security factors at client machine 110. In particular, server 130 can send instructions to client program 114 for execution by client program 114. The sent instructions can be executed at client machine 110 using reflection techniques. The sent instructions, when executed by client program 114, obtain the requested client security factors and provide them back to server 130. In this configuration, client program 114 need not be pre-configured with instructions for obtaining and providing the requested client security factors.

Some embodiments disclosed herein are used to improve cyber security by enhancing trustworthiness of information release by server 130.

Establishing Client Machine Trust

According to some embodiments, trusted actor 202 installs client program 114 on client machine 110. Trusted actor 202 then install client security factor provider 116 on client machine 110 by linking it to the installation of client program 114 on client machine 110. To do this, trusted actor 202 may run or execute registration utility 118 at client machine 110. Upon execution, registration utility 118 may inspect client machine 110's BIOS or trusted platform module (TPM) to obtain information therefrom. Based on the information obtained from the BIOS or TPM, registration utility 118 generates a unique hash code for client machine 110 that serves as machine identifier 112 of client machine 110. The trusted actor 202 may then store the hash code in trusted registry 140.

Client Security Factor Retrieval

According to some embodiments, client program 114 is configured "out-of-the-box" with support for a number of client security factors. Client program 114 can also be extended to support addition client security factors by one or more client security factor providers 116. Client security factors can be independently enabled or disabled in server 130 to create a custom security requirement to be satisfied for database access. The table below lists some example client security factors that client program 114 can support. Additional factors can be added to server 130 using a stored procedure language such as a PL/SQL API.

| Example Client Security Factors | |
|---|---|
| Static | Dynamic |
| Trusted Platform Module (TPM) information | File Contents - secrets in a Wallet for example |
| Machines Serial Numbers | 3rd Party COTS process exists (Audit, Virus Scan, Intrusion Detection) |
| MAC Address | Customer 3rd Party COTS SDK - e.g. Dongle SDK Inter-operability |
| OS Version, Kernel/Patch levels | J2EE HTTP Session and Cookie Information |
| Services enabled (ipfilter/iptables, audit, label daemon) | HTTP REST Request Result |
| Windows Registry Info | LDAP Attribute Search Results |
| Custom System API | Results return from any of: (1) an operating system application program interfaces call, (2) a representational state transfer (REST) request, (3) a client program 114 API call, or (4) a virtual machine (hypervisor) API call. |

According to some embodiments, one or more stored procedures (e.g., PL/SQL procedures) are defined in server 130 that accept client security factor values from client program 114. The stored procedures are used in server 130 to customize how the client security factors provided by client program 114 are handled by server 130. For example, a stored procedure might set a client security factor in server session 134. When set in server session 134, the client security factor is accessible to other capabilities of server 130 such as, for example, providing database views, stored procedures, access control, virtual private database, auditing, data redaction, etc. In particular, those capabilities can evaluate client security factors set in server session 134 when providing their respective functionality.

According to some embodiments, when client program 114 connects to server 130 via IPC mechanism 120, client program 114 computes the machine registration digest for client machine 110 and sends the computed machine registration digest to server 130. Server 130 attempts to valid the machine registration digest by checking for its existence in trusted registry 140. If the machine registration digest is unknown, server 130 terminates server session 134.

Otherwise, if machine registration digest is known in registry 140, then server 130 sends a set of instructions to client program 114. The set of instructions represent a set of requested client security factors for client program 114 to obtain at client machine 110. Client program 114 obtains the requested set of client security factors and provides them to server 130. If any of the requested client security factors are obtained from a client security factor plugin, then this may be specified in the set of instructions sent by server 130 to client program 114. In this case, server 130 can also require client program 114 to computed and provide a digest of any client security factor provider from which a requested client security factor is obtained by client program 114. Thus, a digest of client security factor provider can be provided by client program 114 to server 130 after and separate from client program 114 providing the machine registration digest to server 130. Note that client program 114 may compute digest or digests of client program 114 and any providers 116 at any time, including just once at the establishment of server session 134. Server 130 receives the client security factor provided by client program 114 and passes them to the appropriate stored procedure call handlers so that the factors can be set in server session 134. When client program 114 sends a request that includes a command to access protected resource 160 such as SQL SELECT, DML, DDL, or EXECUTE statement to access protected resource 160, server 130 may evaluate a security policy protecting resource 160 against the set of client security factors set in server session 134. In some embodiments, an appropriate stored procedure call handler is determined based on call handler identifying information associated with at least one of: (1) the authentication identity of a user of client machine 110 (e.g., a user of client program 114 at client machine 110), (2) the client machine 110 or its machine registration digest, or (3) a combination of (1) the authentication identity and (2) the client machine 110 or its machine registration digest.

Client Security Factor Providers

According to some embodiments, a client security factor provider is a standalone library but in a programming language such as C, .NET, or Java. The client security factor provider may be configured to obtain security-relevant client security factors at client machine 110.

According to some embodiments, a client security factor provider is a Java-based plugin for J2EE applications. In this case, the client security factor provider is configured to collect information HTTP session, cookie, attribute, or header information in HTTP requests.

According to some embodiments, a client security factor provider is a Java-based plugin configured to perform a LDAP search against a LDAP-capable directory. More information on the lightweight directory access protocol (LDAP) is available on the Internet at /wiki/Lightweight_Directory_Access_Protocol in the wikipedia.org domain, the entire contents of which is hereby incorporated by reference.

According to some embodiments, a client security factor provider is a Java-based plugin configured to carry out a security assertion markup language (SAML) assertion. More information on SAML is available on the Internet at /wiki/Security_Assertion_Markup_Language in the wikipedia.org domain, the entire contents of which is hereby incorporated by reference.

According to some embodiments, a client security factor provider offers extensible Java, C, or .NET interfaces that allow for custom plugin development.

Basic Computing Machine

Some embodiments of trusted client security factor-based authorizations at server are implemented using a computing system comprising one or more processors and storage media. The one or more processors and storage media may be provided by one or more basic computing machines. FIG. 5 is a block diagram of an example basic computing machine 500 that may be used to implement some embodiments of trusted client security factor-based authorizations at server.

Basic computing machine 500 and its hardware components, including their connections, relationships, and functions, is meant to be exemplary only, and not meant to limit implementations of trusted client security factor-based authorizations at server. Other computing machines suitable for implementing trusted client security factor-based authorizations at server may have different components, including components with different connections, relationships, and functions.

Basic computing machine 500 includes a bus 502 or other communication mechanism for addressing a main memory 506 and for transferring data between and among the various components of basic computing machine 500.

Basic computing machine 500 also includes a processor 504 coupled with bus 502 for processing information. Processor 504 may be a general-purpose microprocessor, a core, a system on a chip (SoC), or another hardware processor or other hardware processing unit.

Main memory 506, such as a random-access memory (RAM) or other dynamic storage device, is coupled to bus 502 for storing information and software instructions to be executed by processor 504. Main memory 506 also may be used for storing temporary variables or other intermediate information during execution of instructions to be executed by processor 504.

Instructions, when stored in storage media accessible to processor 504, render basic computing machine 500 into a special-purpose computing machine that is customized to perform the operations specified in the instructions. The terms "software", "software instructions", "computer program", "computer-executable instructions", "processor-executable instructions," or other "instructions" that are configured for execution by a processor (e.g., 504) are to be broadly construed to cover any machine-readable information, whether or not human-readable, for instructing a computing machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Basic computing machine 500 includes a read-only memory (ROM) 508 or other static storage device coupled to bus 502 for storing static information and software instructions for a processor 504.

A mass storage device 510 is coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Mass storage device 510 may store a body of program and data for directing operation of basic computing machine 500, including an operating system, user application programs, driver, and other support files, as well as other data files of all sorts.

Basic computing machine 500 may be coupled via bus 502 to a display 512, such as a liquid crystal display (LCD) or other electronic visual display, for displaying information to a computer user. A touch sensitive surface incorporating touch detection technology (e.g., resistive, capacitive, etc.) may be incorporated with display 512 to form a touch sensitive display for communicating touch gesture (e.g., finger or stylus) input to processor 504.

An input device 514 may be coupled to bus 502 for communicating information and command selections to processor 504. Input device 514 may include alphanumeric and other keys. Input device 514 may include one or more physical buttons or switches such as, for example, a power (on/off) button, a "home" button, volume control buttons, or the like.

A cursor control 516, such as a mouse, a trackball, touchpad, touch-sensitive surface, or cursor direction key for communicating direction information and command selections to processor 504 and for controlling cursor movement on display 512, may be coupled to bus 502. Cursor control 516 may have two degrees of freedom in two axes, a first axis (e.g., x) and a second axis (e.g., y), that allows the device to specify positions in a plane. Cursor control 516 may have more degrees of freedom with a third axis (e.g., z). For example, cursor control 516 may have three translational degrees of freedom (e.g., surge, heave, and sway) in three perpendicular axes, that allows specification of position in the three axes. Cursor control 516 may have three rotational degrees of freedom (e.g., pitch, yaw, roll) about three perpendicular axes, that allows specification of an orientation about the three axes.

While one or more of display 512, input device 514, and cursor control 516 may be external components (e.g., peripheral devices) of basic computing machine 500, some or all of display 512, input device 514, and cursor control 516 may be integrated as part of the form factor of basic computing machine 500.

A function or operation of the present invention may be performed by basic computing machine 500 in response to processor 504 executing one or more computer programs of instructions contained in main memory 506. Such instructions may be read into main memory 506 from another storage medium, such as a storage device 510. Execution of the instructions contained in main memory 506 cause processor 504 to perform the function or operation.

While a function or operation of trusted client security factor-based authorizations at a server may be implemented entirely with computer program instructions, hard-wired or programmable circuitry of basic computing machine 500 (e.g., an ASIC, a FPGA, or the like) may be used in place of or in combination with computer program instructions to perform the function or operation.

The term "storage media" as used herein refers to any non-transitory media that store data and/or software instructions that cause a computing machine to operate in a specific fashion. Such storage media may comprise non-volatile media and/or volatile media. Non-volatile media includes, for example, non-volatile random-access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a data communications network. Basic computing machine 500 can receive the data over the data communications network and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Basic computing machine 500 may include a communication interface 518 coupled to bus 502. Communication interface 518 provides a two-way data communication coupling to a wired or wireless network link 520 that connects basic computing machine 500 to a data communications network 522 (e.g., a local area network (LAN), a wide area network (WAN), a wireless local area network (WLAN), a metropolitan area network (MAN), a storage area network (SAN), etc.). Network link 520 provides data communication through network 522 to one or more other networked devices.

Communication interface 518 may send and receive electrical, electromagnetic, or optical signals that carry digital data streams representing various types of information. For example, communication interface 518 may be implemented by a wired network interface card, a wireless network interface card with an integrated radio antenna, or a modem.

Network link 520 may provide a connection through network 522 to a host computer or to data equipment operated by an Internet Service Provider (ISP). The ISP may in turn provide data communication services through the world-wide packet data communication network now commonly referred to as the "Internet". Network 522 and Internet use electrical, electromagnetic or optical signals that carry digital data streams. The signals through the various networks and the signals on network link 520 and through communication interface 518, which carry the digital data to and from basic computing machine 500, are example forms of transmission media.

Basic computing machine 500 can send messages and receive data, including program code, through network 522, network link 520, and communication interface 518. In the Internet example, a server might transmit a requested code for an application program through Internet, ISP, and network 522 and communication interface 518.

The received code may be executed by processor 504 as it is received, and/or stored in storage device 510, or other non-volatile storage for later execution.

Basic Software System

Figure 5:
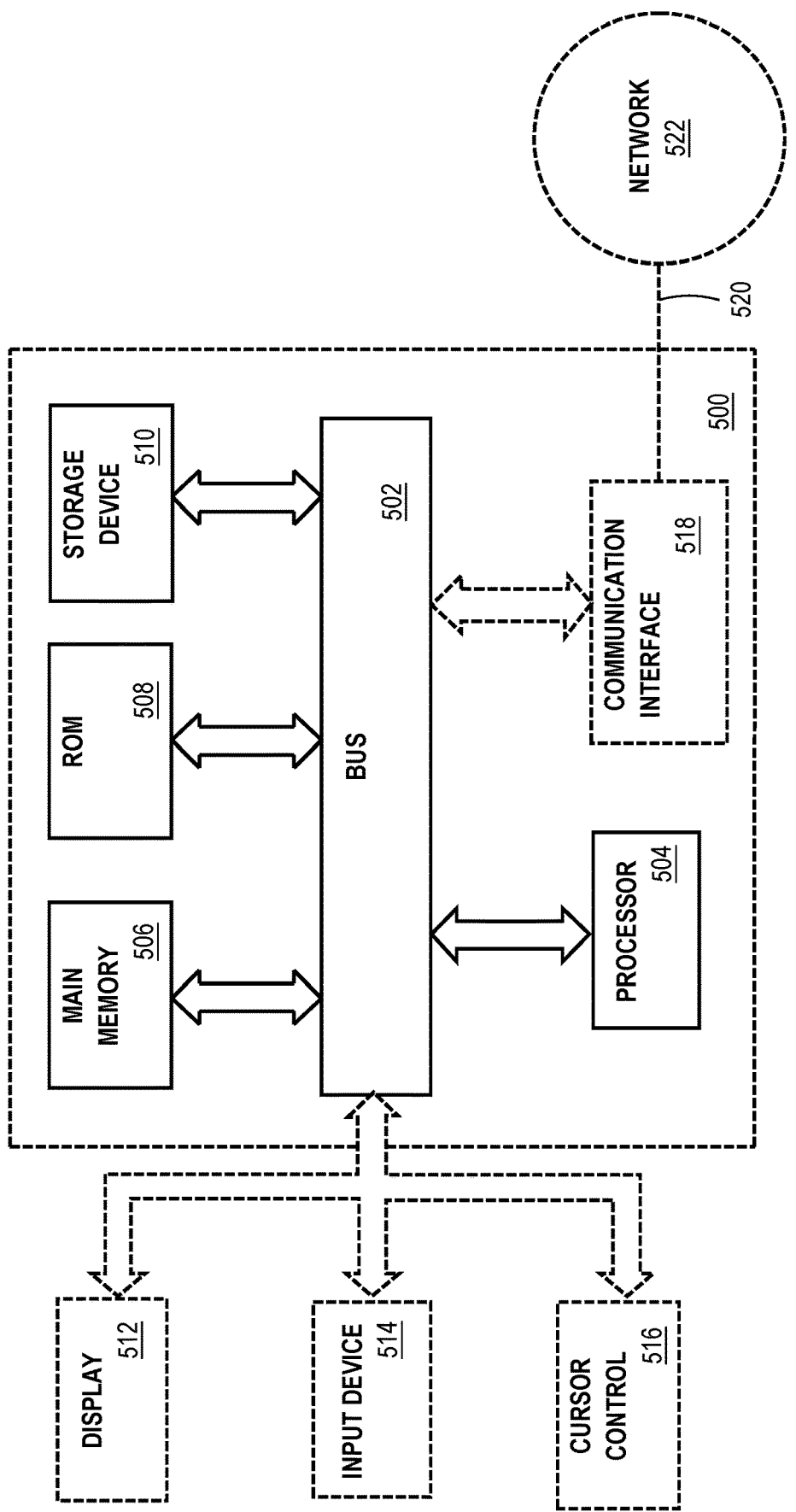
FIG. 5 is a block diagram of a basic computing machine with which some embodiments of trusted client security factor-based authorizations at server are implemented.
Figure 6:
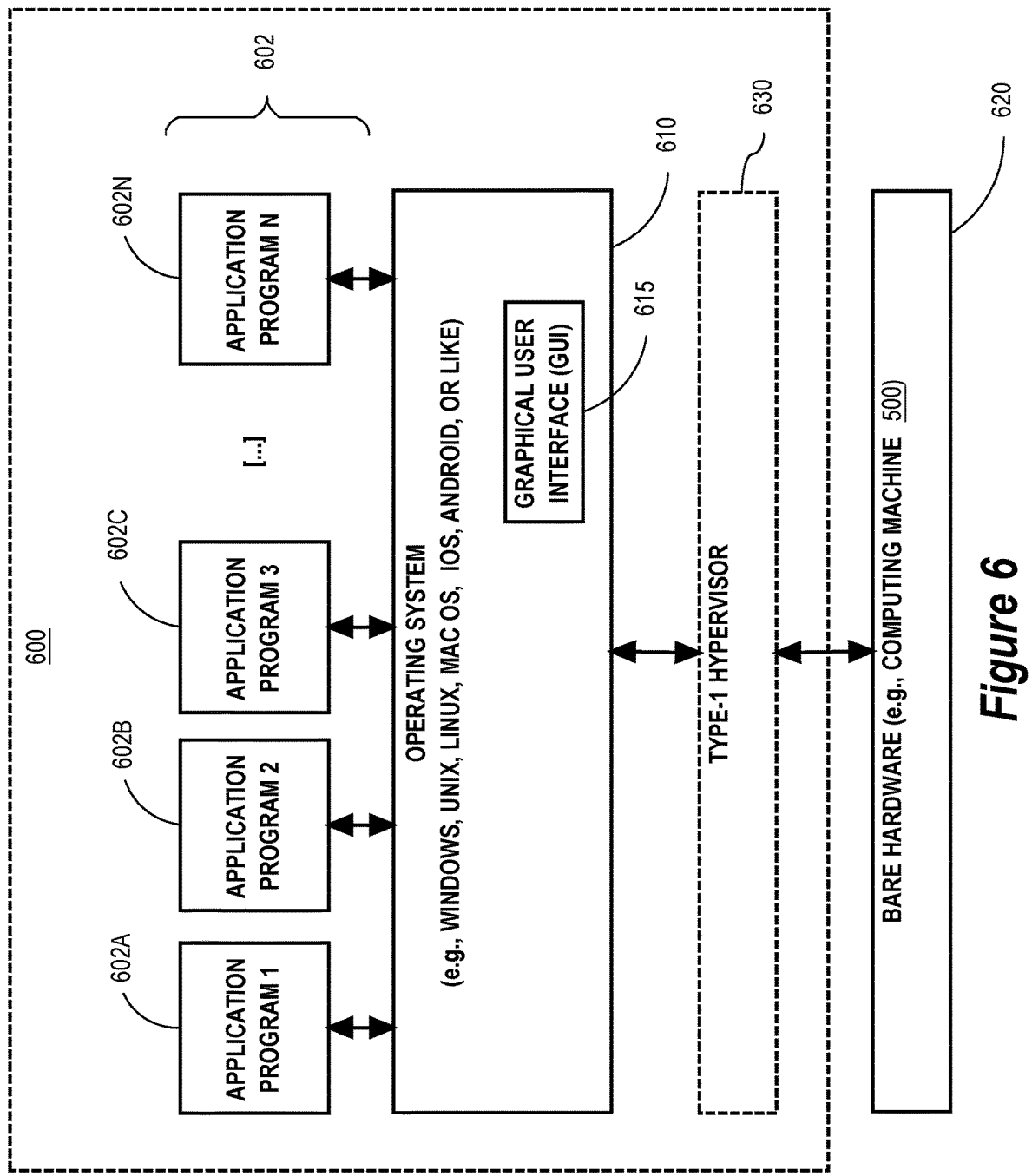
FIG. 6 is a block diagram of a basic software system for controlling the operating of a basic computing machine according to some embodiments of trusted client security factor-based authorizations at server.

FIG. 6 illustrates a basic software system 600 that may be employed for controlling the operation of hardware machine 500 of FIG. 5 according to some embodiments of trust client security factor-based authorizations at server. Software system 600 and its software components, including their connections, relationships, and functions, is meant to be exemplary only, and not meant to limit implementations of the present invention. Other software systems suitable for implementing the present invention may have different components, including components with different connections, relationships, and functions.

Software system 600 is provided for directing the operation of hardware machine 500. Software system 600 may be stored in system memory (RAM) 506 and on fixed storage (e.g., hard disk or flash memory) 510.

Software system 600 includes a kernel or operating system (OS) 610. OS 610 manages low-level aspects of computer operation, including managing execution of processes, memory allocation, file input and output (I/O), and device I/O.

Software system 600 includes one or more application programs, represented as 602A, 602B, 602C . . . 602N, that may be "loaded" (e.g., transferred from fixed storage 510 into memory 506) for execution by hardware machine 500. The applications or other software intended for use on hardware machine 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. GUI 615 also serves to display the results of operation from the OS 610 and applications 602, whereupon the user may supply additional inputs or terminate the session (e.g., log off).

Software system 600 can execute directly on bare hardware 620 (e.g., machine 500). Alternatively, a "Type-1" hypervisor 630 may be interposed between the bare hardware 520 and OS 510 as part of software system 600. Hypervisor 630 acts as a software "cushion" or virtualization layer between the OS 610 and bare hardware 620. Hypervisor 630 instantiates and runs one or more virtual machine instances. Each virtual machine instance comprises a "guest" operating system, such as OS 610, and one or more applications, such as applications 602, designed to execute on the guest operating system. Hypervisor 630 presents the guest operating systems with a virtual operating platform and manages the execution of the guest operating systems.

Hypervisor 630 may allow a guest operating system to run as if it is running on bare hardware 620 directly. In this case, the guest operating system as configured to execute on bare hardware 620 can also execute on hypervisor 630. In other words, hypervisor 630 may provide full hardware virtualization to the guest operating system. Alternatively, hypervisor 630 may provide para-virtualization to the guest operating system. In this case, the guest operating system is "aware" that it executes on hypervisor 630 and is specially designed or configured to execute on hypervisor 630.

Extensions and Alternatives

In the foregoing specification, some embodiments of trusted client security-based authorizations at a server have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising, at a client machine comprising one or more processors:
   producing a machine registration digest using a cryptographic hash algorithm and a digest of a client program installed on the client machine, the digest provided as input to the cryptographic hash algorithm;
   the client program sending the machine registration digest to a server;
   the client program receiving an instruction from the server to collect one or more client security factors;
   based on the receiving the instruction from the server, the client program collecting the one or more client security factors;
   the client program providing the one or more client security factors to the server;
   the client program sending a request to the server, the request including a command to access a resource protected by the server; and
   the client program causing the server to allow the command to access the resource based on at least one of the one or more client security factors.

2. The method of claim 1, further comprising:
   computing the machine registration digest using a machine identifier of the client machine as input to the cryptographic hash algorithm, and obtaining the machine identifier of the client machine from a basic input/output system (BIOS) device of the client machine.

3. The method of claim 1, further comprising:
   computing the machine registration digest using a machine identifier of the client machine as input to the cryptographic hash algorithm, and obtaining the machine identifier of the client machine from a trusted platform module (TPM) device of the client machine.

4. The method of claim 1, wherein the command to access the resource protected by the server is a structured query language (SQL) SELECT statement for execution against the resource protected by the server.

5. The method of claim 4, wherein the resource protected by the server is a database table, row, column, or cell.

6. The method of claim 1, wherein the command to access the resource protected by the server is a Hypertext Transfer Protocol (HTTP) GET, POST, or HEAD command.

7. The method of claim 1, wherein:
   the instruction received from the server to collect one or more specified client security factors indicates that a particular client security factor of the one or more client security factors is to be collected using a particular client security factor provider;
   the particular client security factor provider operates as a plugin to the client program; and
   the method further comprises:
      the client program using a cryptographic hash algorithm to compute a digest of the particular client security factor provider, and
      the client program providing the digest of the particular client security factor provider to the server.

8. The method of claim 1, wherein the one or more client security factors collected at the client machine and provided to the server include one or more of:
   information collected from a trusted platform module (TPM) device of the client machine,
   a serial number of the client machine,
   a media access control (MAC) address of the client machine,
   an operating system version of the client machine,
   an operating system kernel patch level of the client machine,
   a list of services that are enabled at the client machine,
   information collected from an operating system registry of the client machine,
   an attribute of an operating system of the client machine,
   contents collected from a filesystem file at the client machine,
   a list of processes executing at the client machine,
   information collected from a Hypertext Transfer Protocol (HTTP) session at the client machine,
   information obtained from a Hypertext Transfer Protocol (HTTP) cookie at the client machine,
   a result received at the client machine from a Hypertext Transfer Protocol (HTTP) request sent from the client machine,
   a result obtained at the client machine from a call to an operating system application programming interface,
   a result obtained at the client machine from a representational state transfer (REST) request,
   a result obtained at the client machine from a call to an application programming interface of the client program, or
   a result obtained at the client machine from a call to an application programming interface of a virtual machine.

9. The method of claim 1, further comprising:
   prior to the client program sending the request to the server, the client program re-collecting a set of the one or more client security factors and sending the re-collected set of the one or more client security factors to the server, wherein the server authorizes the command to access the resource based on at least one client security factor of the re-collected set of the one or more client security factors.

10. One or more non-transitory computer-readable media storing one or more programs, the one or more programs comprising instructions which, when executed by a client machine having one or more processors, are capable of causing the client machine to perform:

producing a machine registration digest using a cryptographic hash algorithm and a digest of a client program installed on the client machine, the digest provided as input to the cryptographic hash algorithm;

the client program sending the machine registration digest to a server;

the client program receiving an instruction from the server to collect one or more client security factors;

based on the receiving the instruction from the server, the client program collecting the one or more client security factors;

the client program providing the one or more client security factors to the server;

the client program sending a request to the server, the request including a command to access a resource protected by the server; and the client program causing the server to allow the command to access the resource based on at least one of the one or more client security factors.

11. The one or more non-transitory computer-readable media of claim 10, wherein the instructions, when executed by the client machine, are capable of causing the client machine to perform:

computing the machine registration digest using a machine identifier of the client machine as input to the cryptographic hash algorithm, and obtaining the machine identifier of the client machine from a basic input/output system (BIOS) device of the client machine.

12. The one or more non-transitory computer-readable media of claim 10, wherein the instructions, when executed by the client machine, are capable of causing the client machine to perform:

computing the machine registration digest using a machine identifier of the client machine as input to the cryptographic hash algorithm, and obtaining the machine identifier of the client machine from a trusted platform module (TPM) device of the client machine.

13. The one or more non-transitory computer-readable media of claim 10, wherein the command to access the resource protected by the server is a structured query language (SQL) SELECT statement for execution against the resource protected by the server.

14. The one or more non-transitory computer-readable media of claim 13, wherein the resource protected by the server is a database table, row, column, or cell.

15. The one or more non-transitory computer-readable media of claim 10, wherein the command to access the resource protected by the server is a Hypertext Transfer Protocol (HTTP) GET, POST, or HEAD command.

16. The one or more non-transitory computer-readable media of claim 10, wherein:

an instruction received from the server to collect one or more specified client security factors indicates that a particular client security factor of the one or more client security factors is to be collected using a particular client security factor provider;

the particular client security factor provider operates as a plugin to the client program; and the instructions, when executed by the client machine, further cause:

the client program using a cryptographic hash algorithm to compute a digest of the particular client security factor provider, and the client program providing the digest of the particular client security factor provider to the server.

17. The one or more non-transitory computer-readable media of claim 10, wherein the one or more client security factors collected at the client machine and provided to the server include one or more of:

information collected from a trusted platform module (TPM) device of the client machine, a serial number of the client machine, a media access control (MAC) address of the client machine, an operating system version of the client machine, an operating system kernel patch level of the client machine, a list of services that are enabled at the client machine, information collected from an operating system registry of the client machine, an attribute of an operating system of the client machine, contents collected from a filesystem file at the client machine, a list of processes executing at the client machine, information collected from a Hypertext Transfer Protocol (HTTP) session at the client machine, information obtained from a Hypertext Transfer Protocol (HTTP) cookie at the client machine, a result received at the client machine from a Hypertext Transfer Protocol (HTTP) request sent from the client machine, a result obtained at the client machine from a call to an operating system application programming interface, a result obtained at the client machine from a representational state transfer (REST) request, a result obtained at the client machine from a call to an application programming interface of the client program, or a result obtained at the client machine from a call to an application programming interface of a virtual machine.

18. The one or more non-transitory computer-readable media of claim 10, wherein the instructions, when executed by the client machine, are capable of causing the client machine to perform:

prior to the client program sending the request to the server, the client program re-collecting at least one of the one or more client security factors and sending the re-collected at least one of the one or more client security factors to the server, wherein the server authorizes the command to access the resource based on the re-collected at least one of the one or more client security factors.

19. A system comprising:

one or more hardware processors;

storage media; and a plurality of programs stored in the storage media, each program of the plurality of programs configured for execution by at least one of the one or more hardware processors, the plurality of programs comprising instructions which, when executed by the one or more hardware processors, are capable of causing the one or more hardware processors to perform:

producing a machine registration digest using a cryptographic hash algorithm and a digest of a client program installed on a client machine, the digest provided as input to the cryptographic hash algorithm;

the client program sending the machine registration digest to a server;

the client program receiving an instruction from the server to collect one or more client security factors;

based on the receiving the instruction from the server, the client program collecting the one or more client security factors;

the client program providing the one or more client security factors to the server;

the client program sending a request to the server, the request including a command to access a resource protected by the server; and the client program causing the server to allow the command to access the resource based on at least one of the one or more client security factors.

20. The system of claim 19, wherein the instructions, when executed by the one or more hardware processors, are capable of causing the one or more hardware processors to perform:

computing the machine registration digest using a machine identifier of the client machine as input to the cryptographic hash algorithm, and obtaining the machine identifier of the client machine from a basic input/output system (BIOS) device of the client machine or a trusted platform module (TPM) device of the client machine.

21. The method of claim 1, wherein the client program collecting the one or more client security factors, the client program providing the one or more client security factors to the server, and the client program sending the request to the server are performed in the context of a trusted session; and wherein the trusted session is established at the server based on the client program sending the machine registration digest to the server.

22. The one or more non-transitory computer-readable media of claim 10, wherein the client program collecting the one or more client security factors, the client program providing the one or more client security factors to the server, and the client program sending the request to the server are performed in the context of a trusted session; and wherein the trusted session is established at the server based on the client program sending the machine registration digest to the server.

23. The system of claim 19, wherein the client program collecting the one or more client security factors, the client program providing the one or more client security factors to the server, and the client program sending the request to the server are performed in the context of a trusted session; and wherein the trusted session is established at the server based on the client program sending the machine registration digest to the server.

* * * * *